May 10, 1949.  H. C. SCHILDMEIER  2,470,054
TIRE WHEEL CREEPER
Filed March 28, 1945

INVENTOR.
HENRY C. SCHILDMEIER.
BY
Lockwood, Goldsmith & Galt
ATTORNEYS.

Patented May 10, 1949

2,470,054

UNITED STATES PATENT OFFICE 2,470,054

TIRE WHEEL CREEPER

Henry C. Schildmeier, Indianapolis, Ind.

Application March 28, 1945, Serial No. 585,313

3 Claims. (Cl. 280—49)

This invention relates to a tire creeper structure.

The chief object of this invention is to provide a portable unit which will readily receive an inflated tire and wheel of single or multiple tire type and sustain the same in elevated position, so that such tire and wheel may be easily applied to an axle.

Such a creeper structure likewise has other uses.

The chief feature of the present invention resides in the simplicity of construction, the rigidity of the same and the portable character of that unit.

Other objects and features of the invention will be set forth more fully hereinafter.

The full nature of the invention will be understood from the accompanying drawings and the following description and claims.

Figure 1:
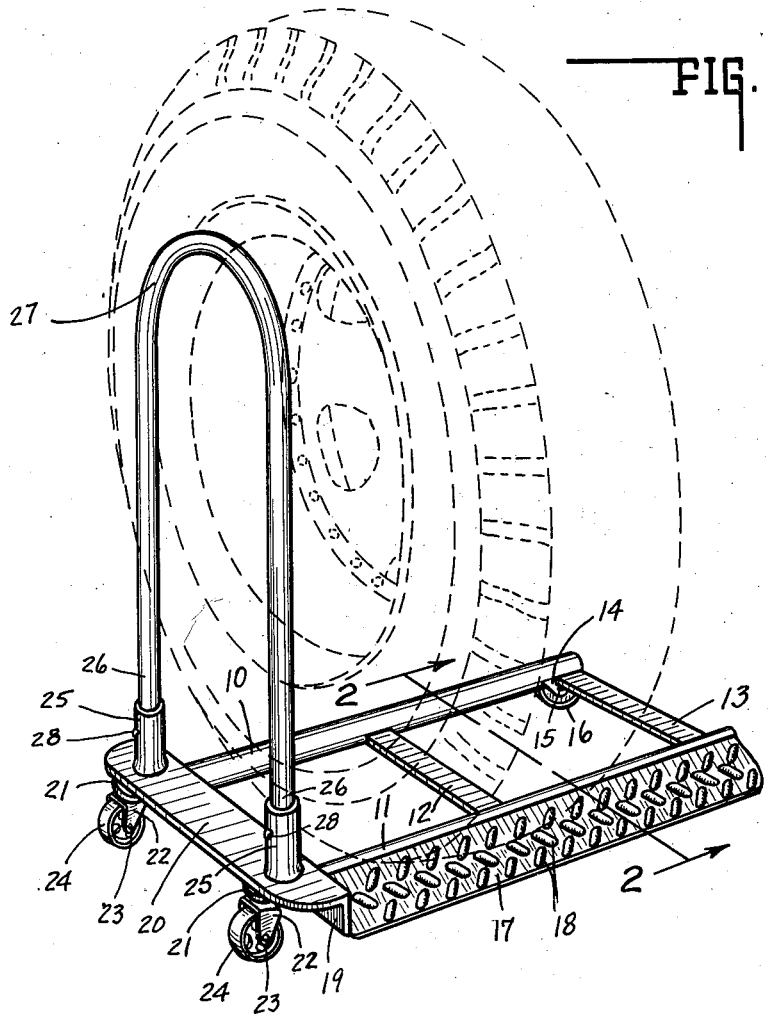

In the drawings Fig. 1 is a perspective view of the invention looking toward the rear and tire mounting side portions, a single tire and wheel representation being shown dotted.

Figure 2:
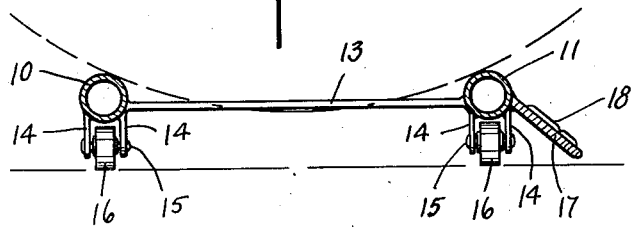

Fig. 2 is a transverse sectional view taken on line 2—2 of Fig. 1 and in the direction of the arrows.

In the drawings, 10 and 11 indicate two substantially parallel metal tubes. Intermediate the ends and about midway around the tubes on their adjacent sides there is welded the cross brace member 12. In like manner at the front end of the tubes there is similarly secured the cross brace 13.

Depending from each front end of the tubes are the short spaced ears 14 apertured to mount the short axle 15 upon which is rotatably mounted between the ears the wheel 16.

Tangential to and coextensive with tube 11 and projecting outwardly and downwardly therefrom is the inclined plate 17 having non-slipping projections 18 on its upper surface.

An angle member, having vertical portion 19 and upper horizontal portion 20, is suitably secured to the rear end of tubes 10 and 11 and inclined plate 17. The foregoing completes an open rectangular frame.

To the under surface of horizontal portion 20 and near the ends thereof are secured the base plate portions 21 of swivelling plate casters, each including a swivelling yoke 22 in the ears of which is mounted axle 23 for caster wheel 24. Such casters usually are pivotally connected between yoke and base by singular or plural ball and race structures to facilitate swivelling.

Near each end of the horizontal portion 20 there is provided tubular sockets 25, which are parallel and upwardly directed. The lower ends 26 of a U-shaped tube 27 are seated in the sockets and secured thereto as at 28. Such tubular member 26—27 serves as a creeper guide and handle as well as a wheel and tire support as illustrated.

When a tire is repaired, it is rolled up on apron 17 and then automatically seats in the open pocket formed between tubes 10 and 11. The length of the creeper is such that mid-brace 12 need not register with the tire, if the tire is of a small diameter. The tube spacing, however, is such that at no time can a tire drag the floor when socket seated.

When the tire is creeper mounted, the creeper is moved to and longitudinally registered with and below the axle so that the wheel can be readily mounted thereon. The front end of the creeper is free of all obstructions so that the creeper can readily be pulled out from beneath the tire if desired, all while the axle is held elevated.

Whenever desired, an oppositely inclined apron may be applied to tube 10.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A non-cocking, tire casing accommodating creeper comprising in combination a pair of substantially parallel tubes, means disposed transversely thereof at opposite ends of the tubes and forming an open type tire casing supporting base wherein the lower portion of the casing may rest, caster wheel means at each of the resulting corners of the base, a plate disposed transversely of the tubes at one end thereof and including upwardly directed sockets disposed near the ends of the said plate, inverted U-shaped handle means having its ends seated in said sockets, and an apron extending downwardly from an upper portion of one tube and outwardly therefrom and the base and rigid and substantially coextensive therewith.

2. A creeper as defined by claim 1 wherein the plate and one of said first mentioned means disposed immediately adjacent said plate comprise an angle sectioned member abutting and secured to the adjacent ends of the tubes and the apron.

3. A creeper as defined by claim 2 wherein the plate portion of the angle member is disposed uppermost and casters at that end of the creeper are of swiveling and plate type, the caster plate portions being secured to the under face of said plate.

HENRY C. SCHILDMEIER.

REFERENCES CITED

The following references are of record in the file of this patent:

UNITED STATES PATENTS

| Number | Name | Date |
|---|---|---|
| 503,105 | Tingley | Aug. 8, 1893 |
| 1,330,891 | Merrill | Feb. 17, 1920 |
| 1,374,986 | Carter | Apr. 19, 1921 |
| 1,482,105 | Andrews et al. | Jan. 29, 1924 |
| 1,706,253 | Raymond | Mar. 19, 1929 |
| 2,070,095 | Shepard, Jr., et al. | Feb. 9, 1937 |
| 2,133,834 | Sheldon | Oct. 18, 1938 |
| 2,210,632 | Perrill | Aug. 6, 1940 |
| 2,229,244 | Husted | Jan. 21, 1941 |

FOREIGN PATENTS

| Number | Country | Date |
|---|---|---|
| 208,667 | Switzerland | Mar. 1, 1940 |
| 695,455 | France | Sept. 30, 1930 |